Aug. 13, 1957

J. D. LEASIA 2,802,381

WORK HANDLING MEANS FOR PRESSES

Filed May 21, 1954

INVENTOR
John D. Leasia

BY
Wm. R. Glisson
ATTORNEY

Aug. 13, 1957   J. D. LEASIA   2,802,381
WORK HANDLING MEANS FOR PRESSES
Filed May 21, 1954   7 Sheets-Sheet 4

INVENTOR
John D. Leasia
BY
Wm. R. Glisson
ATTORNEY

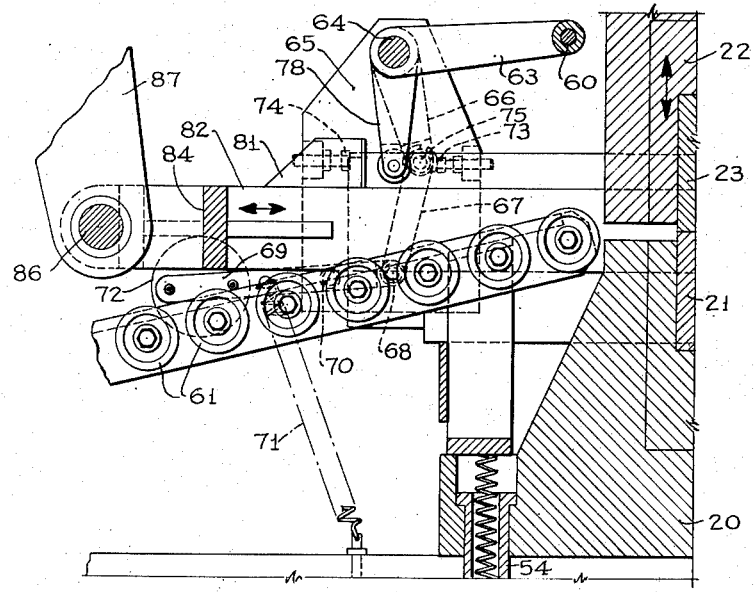

Aug. 13, 1957 J. D. LEASIA 2,802,381
WORK HANDLING MEANS FOR PRESSES
Filed May 21, 1954 7 Sheets-Sheet 7

INVENTOR
John D. Leasia
BY
Wm. R. Glisson
ATTORNEY

United States Patent Office 2,802,381
Patented Aug. 13, 1957

2,802,381

WORK HANDLING MEANS FOR PRESSES

John D. Leasia, Royal Oak, Mich., assignor to The Budd Company, Philadelphia, Pa., a corporation of Pennsylvania Application May 21, 1954, Serial No. 431,455

5 Claims. (Cl. 78—99)

This invention relates to work handling means for presses, particularly, in the illustrated embodiment, to apparatus for feeding flanged wheel hub blanks to a die press and for removing finished blanks from the press, and has for an object the provision of improvements in this art.

One of the particular objects of the invention is to provide work handling means for a press which is positively timed in its action with the action of the press so as to complete the feeding and ejecting action while the press dies are separated whereby to avoid all interference and possibility of damage when the dies are active on the blank.

Another object is to provide improved blank feeding means which will bring a blank accurately into working position and drop it down into proper position for the action of the dies.

Another object is to provide improved blank removing means which will lift the finished blank out of working position into the path of ejecting means, the ejecting means then removing it from the press.

Another object is to provide blank feeding means and blank ejecting means which act at the same time in positive coordination.

Another object is to provide improved means for removing blanks from a primary blank ejecting device and delivering them to blank transfer means.

Another object is to provide improved means for lifting blanks from working position.

Another object is to provide improved mechanical connections between a press head plunger or ram and a reciprocating blank conveying carriage which will impart full and accurate movements to the carriage without heavy shocks at starting and stopping and without possibility of damage by slight variations in press stroke.

The above and other objects and advantages of the invention will be evident from the accompanying description of an illustrative embodiment, reference being made to the accompanying drawings thereof, wherein:

Fig. 9 is an enlarged partial vertical longitudinal section showing the blank feed-off mechanism seen in Fig. 3;

Fig. 10 is a view similar to Fig. 9 but showing a formed blank in the feed-off position, the parts being shown just prior to the Fig. 5 position;

Fig. 11 is a view similar to Fig. 9 but showing the parts in the Fig. 5 position;

Figure 1:
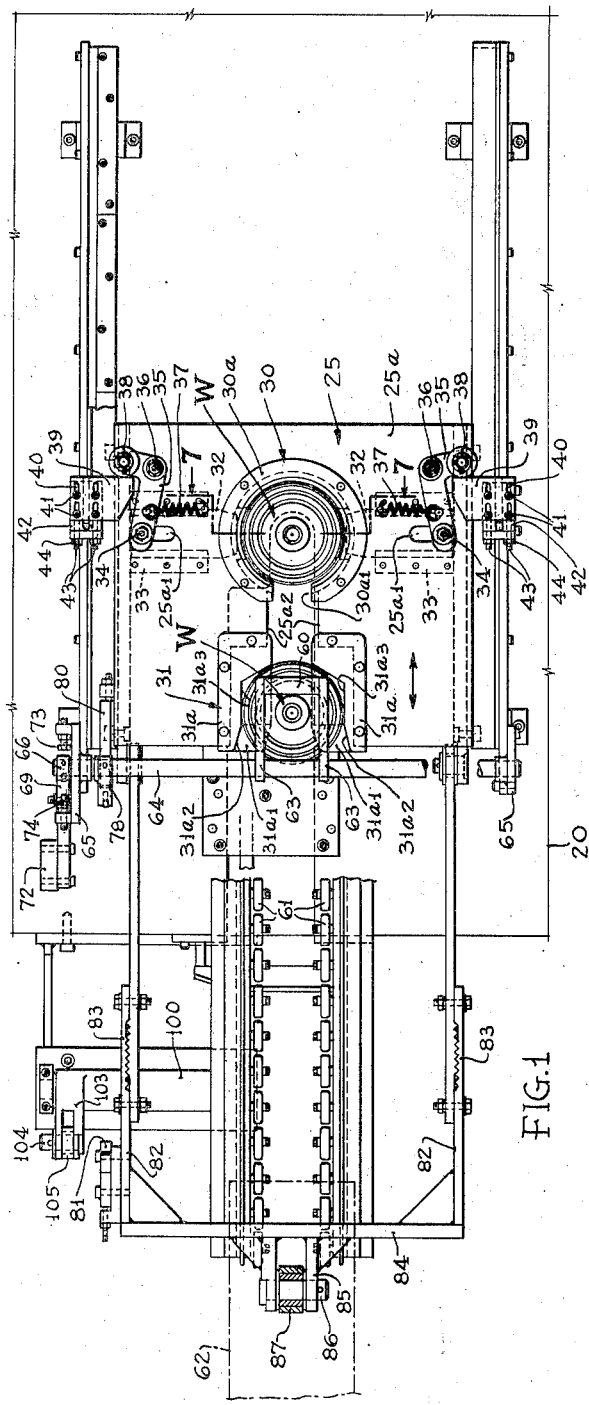
Fig. 1 is a plan view of a machine embodying the invention.

The press with which the present work handling means is illustrated comprises a base 20 having a lower die 21 and a reciprocating head, ram, or plunger 22 having an upper die 23. By way of example, it may be noted that the dies in the present case perform a cold coining operation on the flanges W1 of a wheel hub blank W, which blank also (Fig. 7) has a lower hub extension W2 and an upper hub extension W3.

The blank handling means comprises a carriage 25 having supporting rolls 26 and side guide rolls 27 operating upon track means generally denoted by the numeral 28. The rolls 26 are held down by upper track guides 28a. The tracks are suitably mounted and secured on the press base by means which are clear from the drawings; and the press parts are cut away, as required, to receive the carriage, tracks, and related parts without interference in operating movements. It is to be noted that the carriage rails are spaced relatively far apart so as to provide generous space for the die holding parts of the press.

The carriage 25 includes an extensive horizontal plate 25a which carries a blank feeding device generally designated by the numeral 30 and a blank ejecting device generally designated by the numeral 31.

The blank feeding device 30 comprises a tubular ring 30a which interiorly fits fairly closely around the flange W1 of a hub blank and which at the rear side is cut out, as at 30a1, to pass the upper hub extension W3 of a blank. The upper edge of the ring 30a is tapered, as at 30a2, to permit blanks to be readily fed down in the the ring. The ring is removable to provide for the use of rings of different dimensions for blanks of different sizes.

Blanks are fed into the feeding device 30, as by hand, when the carriage is in its front position. Means are provided on the feeding means for holding a blank in elevated position in the ring until it is in operating position in the press and then dropping it out of the feed device and down upon the lower die so the feed device may return without the blank.

The blank supporting means herein illustrated comprises oppositely disposed laterally movable fingers or pins 32 which operate in guides 33 secured to the carriage plate 25a. The guides 33 are secured beneath the plate 25a and a stud pin 34 on a blank supporting pin 32 extends up through a slot 25a1 in the plate. The pins 34 enter elongated holes in one arm of bell crank levers 35 which are pivoted on pins 36 carried by the carriage plate. The bell crank levers 35 are biased in the direction to move the pins 32 inward by springs 37. The other arm of a bell crank lever 35 is provided with a hardened striker roller 38 which, near the end of the feeding movement of the carriage, strikes the front face of an abutment 39 which is adjustably secured along the track supporting structure.

The abutments 39 have slots 40 receiving clamp screws 41 which are carried by fixed brackets 42 having adjusting screws 43 with lock nuts 44.

By the described apparatus, the pins 32 are pulled out when the carriage is in its rear position to permit the blank to drop and are returned inward when the carriage returns to the front blank receiving position so as to support a blank when it is placed in the holder ring.

The blank ejecting means 31 comprises spaced fork-like fingers 31a which are secured on the sides of a slot 25a2 which extends back from the ring 30a and out the rear edge of the carriage plate. The fingers 31a are beveled upward, as at 31a1, and inward, as at 31a2, from the open end and together constitute a fork for picking up a blank by its flange W1. The lower hub extension W2 passes freely in the slot formed between the inner edges of the fingers (as does the upper hub extension W2 as well) and the hub flange is positioned by side walls 31a3 of the fingers. The fingers are removable for replacement to accommodate hubs of different dimensions.

It will be seen that the fingers 31a will pick up and remove a blank as the carriage moves from front to rear with a new blank in the feeding means if the finished blank is lifted from its operating position. Means are provided for lifting up a blank for removal by the fingers, the blank lifting means here illustrated comprising a lift pin 50 operating in a vertical bore in the lower die holder. The upper end of the lift pin 50 engages the lower end of the lower hub extension W2 of a hub blank.

In the lower portion of the lift pin 50 a slot 50a is provided to receive the rounded end of a pin lifting arm 51 which is pivoted on a pin 52 carried by a fixed depending bracket 53. A spring biased pin 54 normally holds the arm 51 downward.

The means provided for lifting the end of the arm 51 upward comprises a reciprocating lift roller 55 movable along a track surface 56 and adapted to cooperate with a switch cam 57 secured on the side of the arm 51. The roller 55 is carried on the end of a push rod 58. On its forward movement the roller 55 moves under the switch cam 57 to lift the arm 51 and on its rearward movement it rides back over the top of the cam and drops down behind it without producing any movement of the arm 51. Thus the lift pin 50 and a hub blank are lifted only on the forward movement of the lift roller 55. As will be explained, this blank lifting action occurs just as the carriage starts its movement from front to rear so that when the fingers 31a reach the blank it is in raised position and the fingers pick it up and move it back with them. The action is such that the lift pin 50 is down before a new blank is in die operating position thereby to avoid interference between the lift pin and the lower hub extension of the new blank.

Means are provided for removing a blank from the fingers of the ejecting means as the carriage moves back toward the front position, the means illustrated comprising a transverse bar or bail 60 which moves down in front of the upper hub extension W3 of a blank as the blank reaches its rear position and which holds the blank against return movement when the carriage returns so that the fingers move out from beneath the blank flange and allow it to drop down on the spaced rolls 61 of a delivery conveyor and move away by gravity. The lower hub extension W2 drops down between the rolls 61. A belt conveyor 62 takes the blanks away. A box vehicle or other means might be provided for this purpose instead of the belt conveyor.

The bail 60 at its ends is secured to spaced arms 63 carried by a transverse shaft 64 supported on brackets 65. At one end the shaft 64 is provided with an arm 66 which comprises a part of a snap toggle mechanism of which the other arm 67 is pivoted by pin 68 to a lever 69 which turns about a fixed pivot pin 70. Means, such as a spring 71 and a weight 72, or either, bias the outer end of lever 68 downward to produce the over-center toggle snap action of the arms 66 and 67. Adjustable stops 73, 74 limit the movement of the elbow of the toggle where the arms 66 and 67 are connected together by a pivot pin 75.

Another arm 78 secured to the shaft 64 carries a striker roller 79 which is adapted to be hit by a striker 80 on the carriage when the carriage moves back in the blank feeding direction and which is hit by a striker 81 on a connecting rod 82 which operates the carriage when the carriage moves to the front to receive a new blank. Both of the cams 80 and 81 are adjustable to produce operation of the toggle snap device at the proper time.

The carriage operating rods 82 are adjustable in length, as at an extensible splice 83 and both are connected to a cross bar 84. The cross bar 84 has arm projections 85 which are connected by a pivot pin 86 to the long arm of a lever 87 which is turnable about a fixed pivot pin 88. The pin 88 is carried by a bracket 89 mounted on a support 90 which is fixed in position relative the press frame.

The short arm of the lever 87 is connected by a pivot pin 91 to a link 92 which at its other end is connected by a pivot pin 93 to a bracket 94 secured to the head or plunger 22 of the press. The relationship of parts is such that when the press head is in its lower position the link 92 is approximately horizontal or on dead center and produces practically no movement of the carriage. The arrangement also is such that the carriage is stopped and started slowly at each end of its stroke and this is especially true as the press head drive itself is at dead center positions at this time. For some distance above its lowermost position the ram 22 causes the pin 93 carried thereby to move in a vertical line which is substantially on an arc about the pivot pin 91 of the link 92 so that the lever 87 and the carriage have practically no movement while the upper die is in a position where it would stand in the path of movement of the carriage or parts carried thereby. In this way all danger of interference between carriage and ram movements is prevented.

The push rod 58 carrying the cam roller 55 is connected by a pin 98 to an arm 99 secured to a sleeve 100 which is mounted to turn on a long pivot pin 101 carried by fixed brackets 102 secured to the base of the press. At a distance from arm 99 the sleeve 100 has rigidly secured thereto an arm 103 which is connected by a pivot pin 104 to a link 105. The link at its other end is connected by a pivot pin 106 to a bracket 107 secured to the press head.

The arrangement of this mechanism is such that the cam roller 55 has rapid movement while the press head is moving and has considerable overtravel at each end relative to the switch cam 57 so that no adjustment of the cam roller drive mechanism is necessary.

Figure 3:
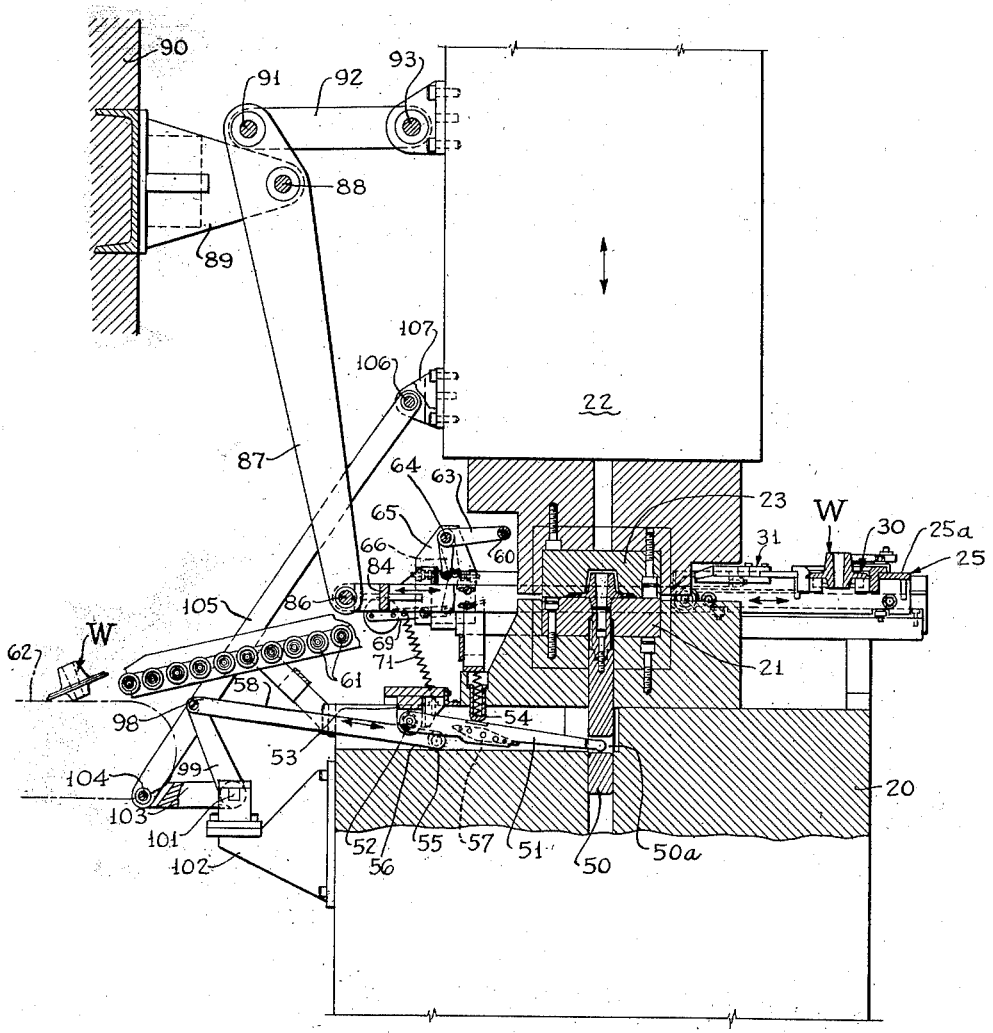
Fig. 3 is a central vertical longitudinal section with the carriage in forward position, a blank having just been placed thereon and another blank being acted upon by the dies.

The operation of the machine is believed to be clear from the foregoing description. To summarize, a blank is placed in the feeding device 30 when it is disposed at the front of the machine, as shown in Fig. 3. At this time another blank is being acted upon by the dies, being entirely clear of the feed carriage.

Figure 4:
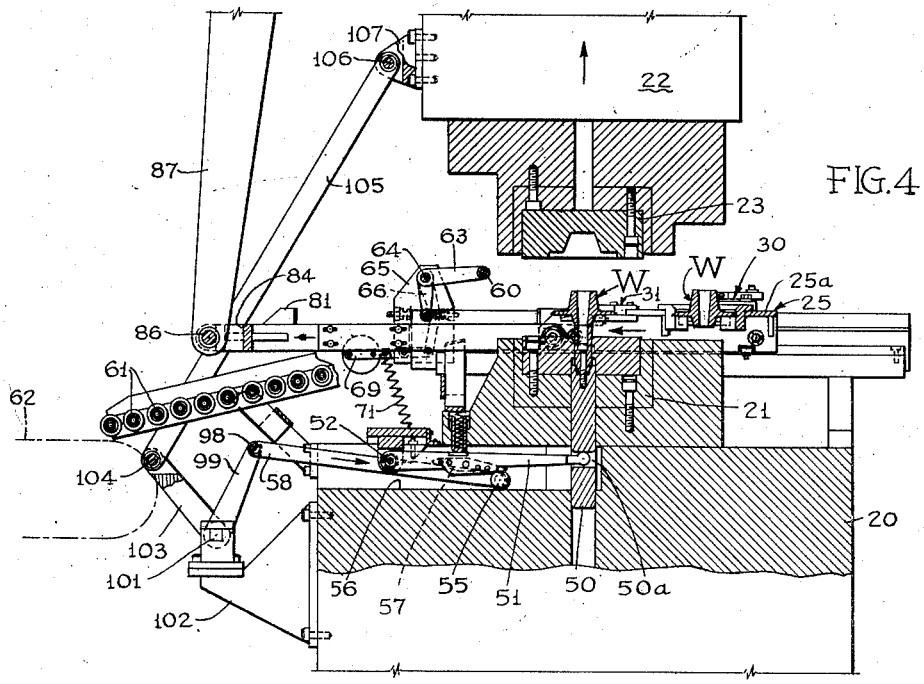
Fig. 4 is a view similar to Fig. 3 but showing the carriage moved partly in with a blank and the formed blank lifted up out of the lower die.
Figure 6:
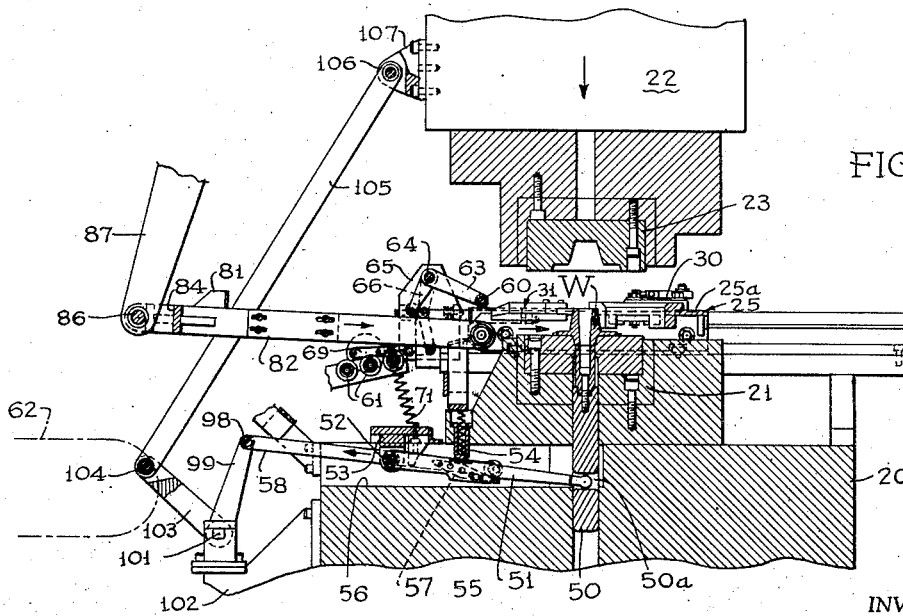
Fig. 6 is a view similar to Fig. 3 but showing the carriage after some travel back toward its forward position, the formed blank having been removed from the rear end of the carriage.

As the carriage moves back, as shown in Fig. 4, the formed blank, which has been lifted by the pin 50, is picked up by the fingers 31a on the rear end of the carriage.

Figure 8:
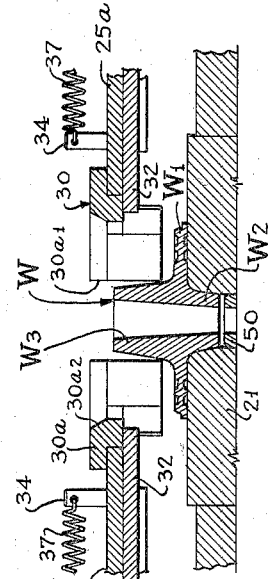
Fig. 8 is a view like Fig. 7 but showing the blank after release to the lower die.
Figure 7:
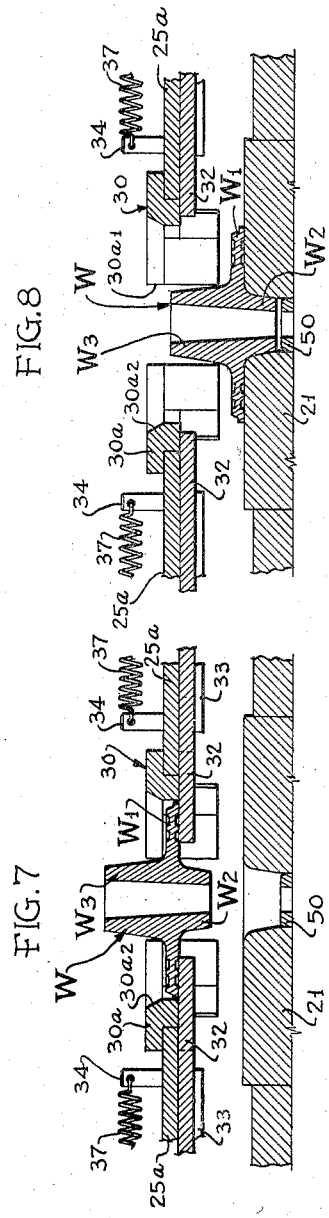
Fig. 7 is an enlarged transverse section taken on the line 7—7 of Fig. 1 showing the front blank holder carrying a blank therein.
Figure 2:
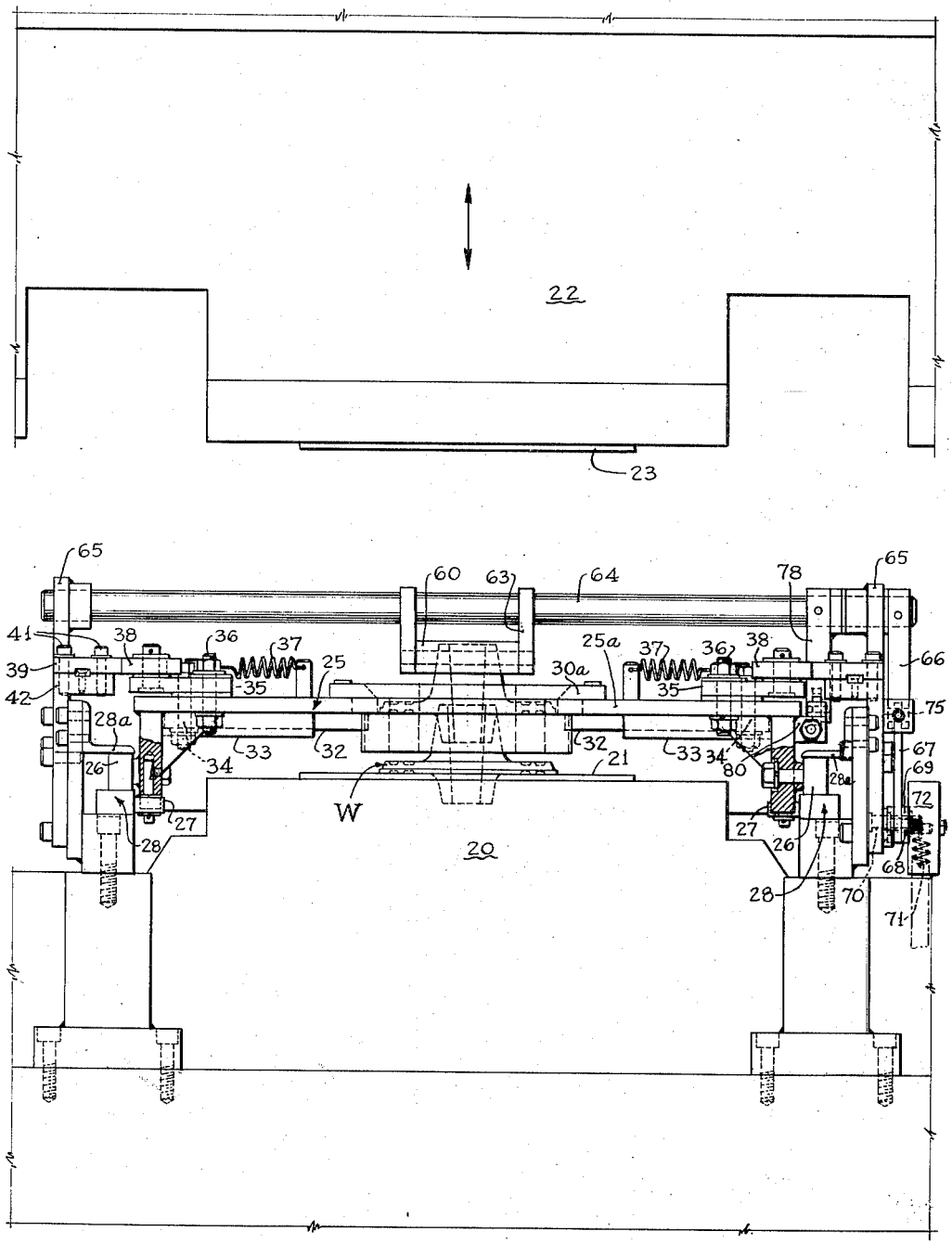
Fig. 2 is an enlarged front end elevation of the machine with parts in section.
Figure 5:
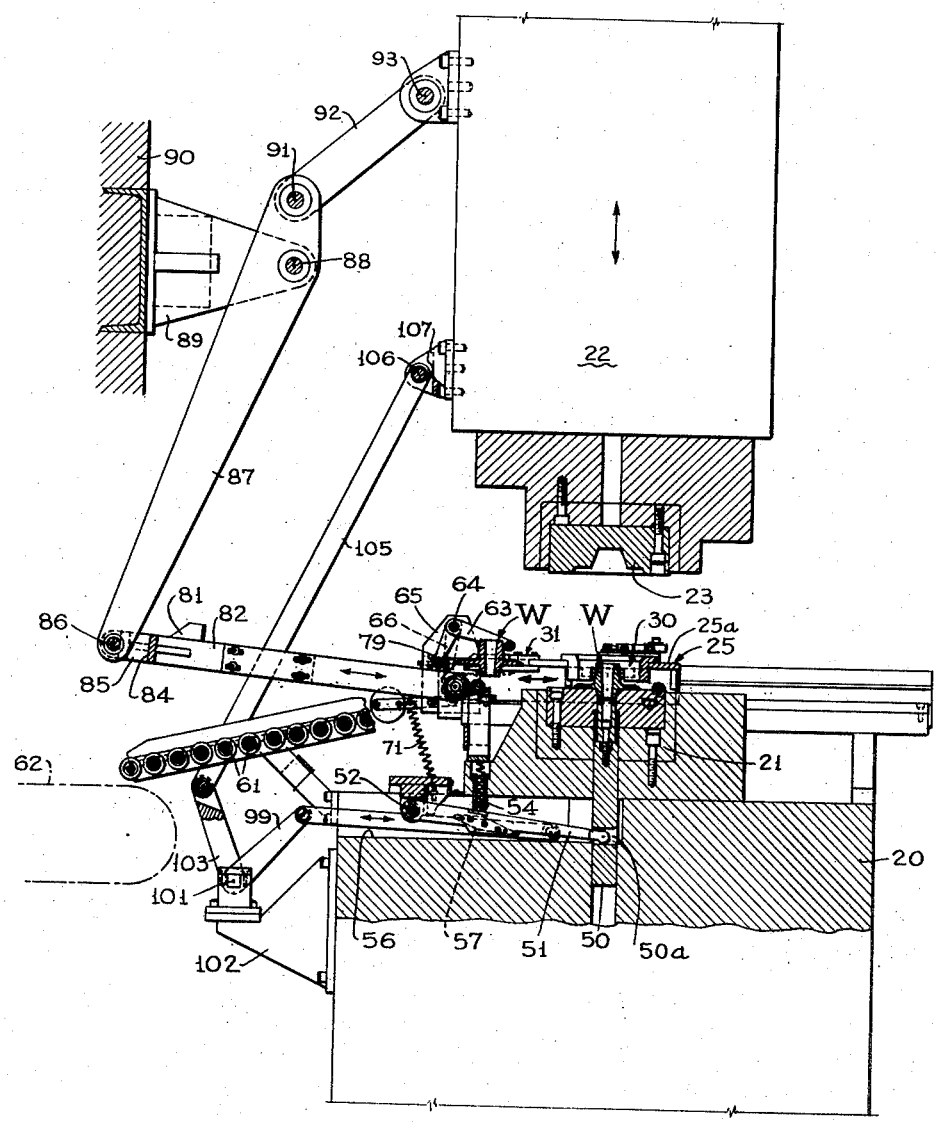
Fig. 5 is a view similar to Fig. 3 but showing the carriage moved all the way in, the new blank dropped into the lower die, and the formed blank moved back ready for removal, the view corresponding with Figs. 1 and 2 as to the position of parts.

When the carriage reaches the extreme rear position, Figs. 1 and 5, the supporting pins 32 are pulled from under the flange of the blank, Figs. 7 and 8, and it drops down in the lower die 21 clear of the carriage.

At the same time the formed blank has been taken to discharge position, Figs. 1, 5 and 11, the bail 60 being in raised position as the formed blank moves into rear position, Fig. 10, to permit the blank hub to pass under it, and the bail being snapped down in front of the top hub end of the blank by the toggle arrangement as the carriage reaches the full rear position.

Figure 12:
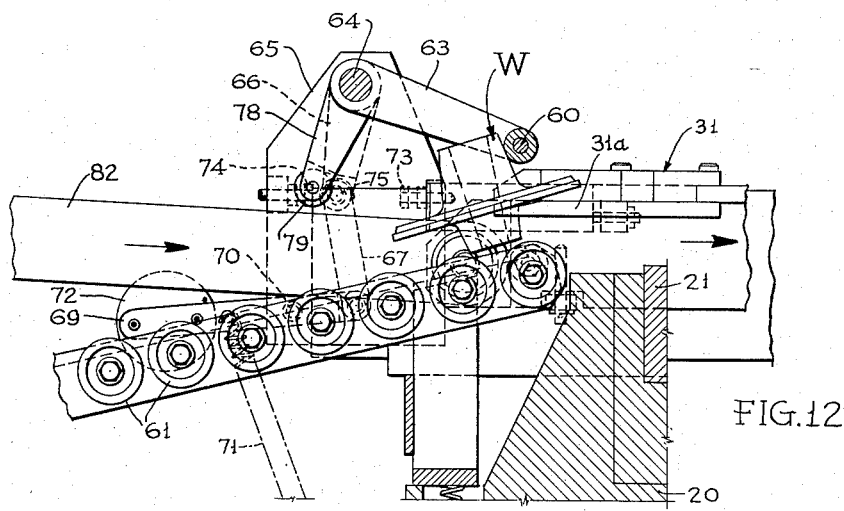
Fig. 12 is a view similar to Fig. 9 but showing the formed blank being moved off the carriage as the carriage moves back on its return stroke.

When the carriage moves on the return stroke toward the front end the bail will hold the blank, Fig. 12, and it will be pulled off the carriage and will drop on the rollers 61 and pass off to the conveyor belt 62.

Figure 13:
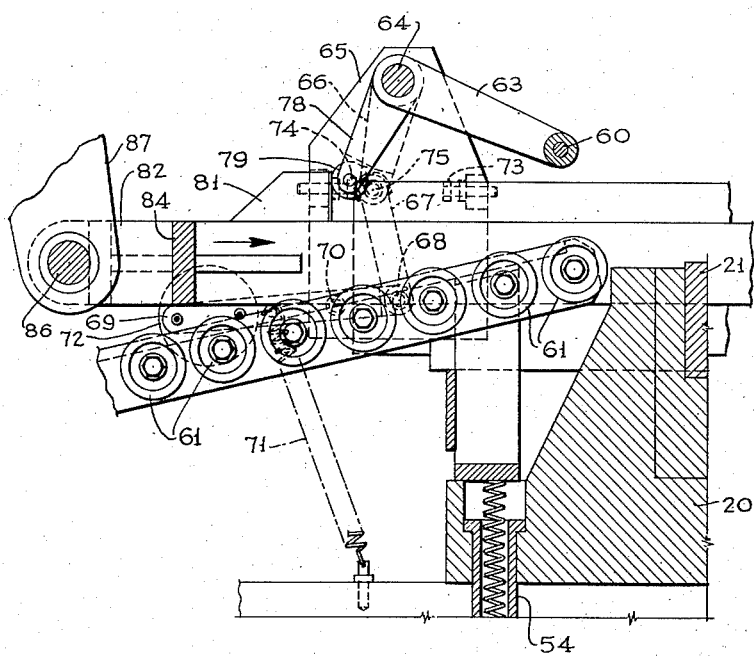
Fig. 13 is a view similar to Fig. 9 but showing the parts with the carriage near its full forward position.

When the carriage reaches the forward end of its stroke, Figs. 3 and 13, the striker 81 will hit the roller 79 of arm 78 to cause the bail 60 to be lifted in order to clear the next blank which moves back.

It will be seen that the invention provides improved blank feeding means which is mechanically operated by the press parts and functions accurately and easily to feed in and remove blanks without disturbing the normal operations.

While one embodiment has been illustrated and described specifically by way of example, it is to be understood that there may be other embodiments within the scope of the invention.

What is claimed is:

1. Work handling means for presses, especially for feeding flanged hubs into and out of presses, comprising in combination with a press having a base and lower die and a reciprocating head and upper die, a transversely reciprocating carriage timed with the movement of the press head, said carriage having feed-in means including a ring receiving a hub flange, retractible means for holding up a hub in the ring, means for withdrawing the retractible means when the hub is over the lower die to drop the hub into the die, said carriage also having hub feed-out means including a rearwardly extending fork adapted to pick up a hub by its flange, means on the press for lifting a hub up into the path of said fork as it moves rearwardly, and means for holding the hub blank to retain and discharge it when the carriage moves back to receive a new blank.

2. Work handling means for reciprocating head die presses, as for handling flanged hub blanks, comprising in combination, a horizontally movable carriage, a fork on the carriage opening to the rear for picking up a blank when the carriage moves to the rear, means timed with the movement of the carriage for lifting a blank into position to be engaged by the fork as the fork approaches the blank, and means movable across the front of the blank to hold it against return movement with the carriage for removing the blank from the fork when the carriage moves back to the front.

3. Work handling means for reciprocating head die presses, as for handling flanged hub blanks, comprising in combination, a horizontally movable carriage, a fork on the carriage opening to the rear for picking up a blank when the carriage moves to the rear, means timed with the movement of the carriage for lifting a blank into position to be engaged by the fork as the fork approaches the blank, and means for removing the blank from the fork when the carriage moves back to the front, said blank-removing means including a bail movable down in front of a blank on the fork, and snap-acting means operated in time with the carriage for moving said bail up and down.

4. Work handling means for a reciprocating head die press, comprising in combination, a carriage movable from front to back, feed-in means on said carriage including retractible means for holding up a blank and moving it into position over a die, means cooperating with said feed-in means and holding means for retracting said holding means and dropping the blank down in the die when the blank is back in position thereover, feed-out means on said carriage behind the feed-in means for picking up a blank and moving it rearward, means for lifting up a blank from the die as said feed-out means approaches in moving toward the rear, and means for removing a blank from said feed-out means when the carriage is in its rear position, said blank lifting means and said carriage being moved in timed relation with each other and with the die head by connections with said die head, said blank-lifting means being operated by a push roller and a switch cam device which lifts the blank only when the roller is moving in one direction relative to the switch cam.

5. Work handling means for a reciprocating head die press, comprising in combination, a carriage movable from front to back, feed-in means on said carriage including retractible means for holding up a blank and moving it into position over a die, means cooperating with said feed-in means and holding means for retracting said holding means and dropping the blank down in the die when the blank is back in position thereover, feed-out means on said carriage behind the feed-in means for picking up a blank and moving it rearward, means for lifting up a blank from the die as said feed-out means approaches in moving toward the rear, and means for removing a blank from said feed-out means when the carriage is in its rear position, said means for removing a blank from said feed-out means including an element movable up and down, an over-center snap toggle device for moving said element down in front of a blank when the blank is in rear position and for moving the element up to clear a blank when it is moving toward the rear.

References Cited in the file of this patent
UNITED STATES PATENTS

| | | |
|---|---|---|
| 912,194 | Smith | Feb. 9, 1909 |
| 1,213,052 | Winkley | Jan. 16, 1917 |
| 1,484,654 | Klocke | Feb. 26, 1924 |
| 1,586,540 | Tweedy | June 1, 1926 |
| 1,859,372 | Mutschler | May 24, 1932 |
| 2,327,117 | Lorant | Aug. 17, 1943 |